Figure 1:
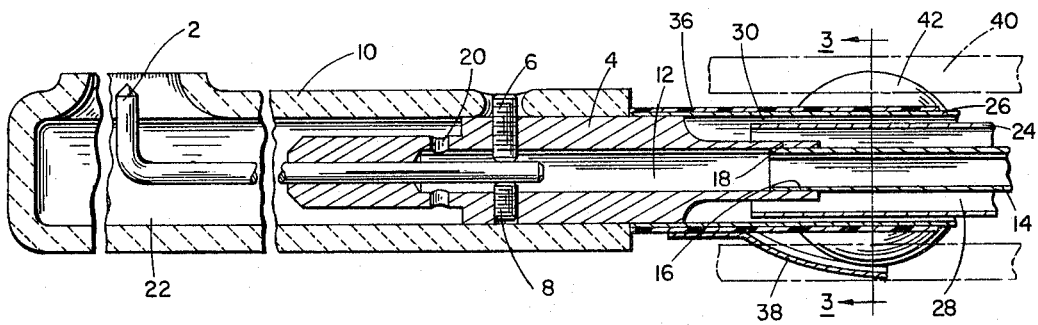

Nov. 29, 1966  R. G. ROHRBERG ET AL  3,288,980

HEAT STRESS RELIEVING APPARATUS

Filed Nov. 18, 1963

INVENTORS
RODERICK G. ROHRBERG
HARRY J. HECKLER
DONALD D. GASTON

BY

ATTORNEY

United States Patent Office 3,288,980
Patented Nov. 29, 1966

3,288,980
HEAT STRESS RELIEVING APPARATUS
Roderick G. Rohrberg, Inglewood, Calif., Harry J. Heckler, Cincinnati, Ohio, and Donald D. Gaston, Santa Monica, Calif., assignors to North American Aviation Inc.
Filed Nov. 18, 1963, Ser. No. 324,367
5 Claims. (Cl. 219—125)

This invention concerns method and means for applying heat to fusion weld or to heat stress relieve workpieces at locations deeply within surrounding structure, wherein such locations are not readily accessible or cannot easily be viewed during the welding or heating process. More particularly, this invention comprises method and apparatus for applying heat progressively along a path proximate a fusion welded seam in metallic workpices of thinwalled or otherwise lightweight construction such as honeycomb sandwich type structures or workpieces having relatively thin portions such as sheet metal flanges joined to similar workpiece portions.

The invention disclosed herein is applicable to the fabrication or stress relieving of any structure which involves joinder of thin-walled or flange-like portions of the type stated above. However, a particular need for this invention exists in connection with fabrication of precipitation hardenable stainless steel sandwich type panels having a lightweight cellular core affixed between two face sheets.

Welding of extremely thin gage sheet metal such as mentioned above presents formidable problems not heretofore encountered in the welding art. As in welding generally, the puddle temperature is normally raised much higher than the melting point of the base metal, and some welding heat permeates the base metal surrounding the weld area. Changes such as expansion and shrinkage of the heat-affected zone normally result from the welding operation, as well as changes in physical properties such as strength and ductility. Moreover, metallurgical effects such as recrystallization and heat treatment occur due to the application of welding heat.

These several effects are particularly acute in the case of light or thin-walled structures due to increased rate of thermal conductivity characteristic of thin-metallic sections, causing welding heat to be generally spread over a wider area. As a result, acute residual stress is caused in such workpieces by shrinkage during cooling of molten metal in the area of the weld, and by phase transformation of the granular structure in the base metal beyond the area of the weld. The foregoing stress and shrinkage problems are especially severe in workpieces comprising so called advanced alloy steels.

Accordingly, it is a general object of this invention to provide a method for forming welded joints in workpieces of thin-walled construction characterized by improved strength and dimensional accuracy.

It is another object in this case to provide a method as stated in the above object adapted for use in relatively inaccessible locations on such workpieces.

It is a further object of the invention disclosed herein to provide method and means for applying heat at distant locations within a workpiece not visible during the heating process.

Figure 2:
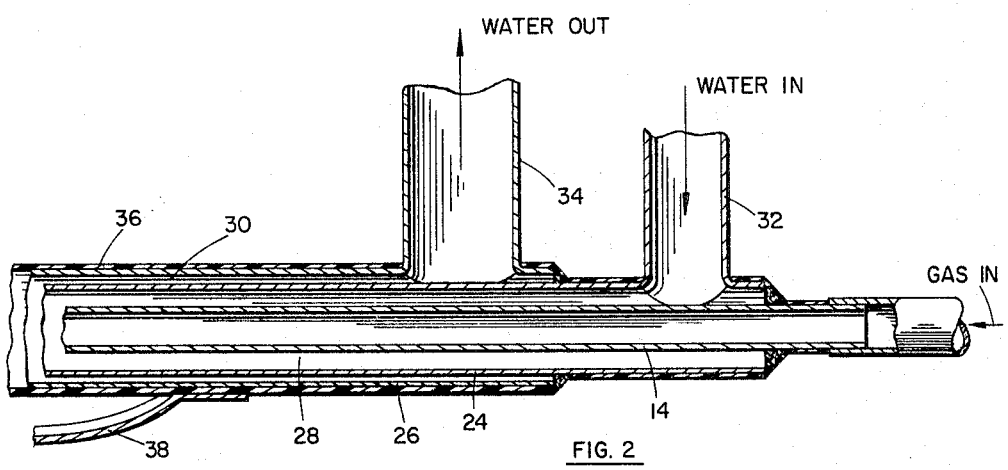
Figure 3:
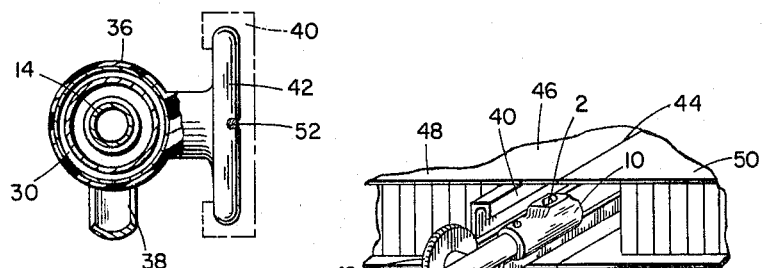
Figure 4:
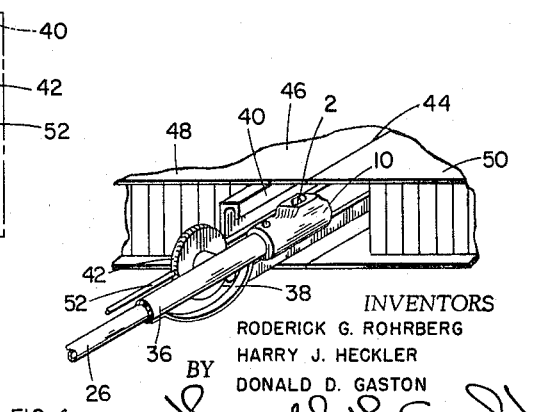

Other objects and advantages will become apparent upon a close reading of the following detailed description of an illustrative embodiment of the invention, reference being had to the accompanying drawings, wherein:

FIGURE 1 shows a fragmentary cross-sectional view taken through one portion of apparatus comprising an embodiment of the inventive concept disclosed herein, FIGURE 2 shows a view corresponding to that shown in FIGURE 1 but taken through a different portion of the same apparatus, FIGURE 3 shows a cross-sectional view taken along line 3—3 in FIGURE 1, and FIGURE 4 shows a perspective view of the apparatus shown in FIGURES 1 through 3 operatively related to a typical workpiece.

Referring to the drawings described above and particularly to FIGURE 1, it may be seen that the inventive concept in this case includes a source of heat which may take the form of a tungsten electrode 2 supported by electrode mounting means in the form of hollow metallic plug 4 and securely held in fixed relationship therewith by suitable means such as set screws 6 and 8. Electrode 2 and plug 4 are contained within a housing 10 of non-conductive material which may advantageously be quartz. An interior longitudinal passage 12 within hollow plug 4 communicates with a first tube 14 which may be stainless steel tubing or similar electrically conductive material secured at one end 16 thereof to the end 18 of hollow plug 4 by appropriate means such as brazing whereby inert gas supplied from an external source (not shown) may be conducted through tube 14 into passage 12 of plug 4 and thence through radial passages 20 into hollow chamber 22 formed within housing 10.

As further seen from FIGURES 1 and 2, first tube 14 is concentrically located within two additional tubes 24 and 26 radially spaced-apart, each from the other, cooperatively forming, together with items 4 and 10 described above, elongate support means for electrode 2 and including a pair of annular passages 28 and 30 for cooling purposes. Thus, a suitable cooling fluid such as water may be supplied through an inlet conduit 32 communicating with passage 28 formed between first tube 14 and second tube 24 whereby the fluid will contact portion 18 of plug 4 to cool the plug, after which the cooling fluid escapes through passage 30 formed between second tube 24 and third tube 26 which communicates with outlet conduit 34 shown in FIGURE 2. Electrical power for welding by electrode 2 may be supplied from a power source (not shown) connected with electrically conductive tube 14. A covering of suitable dielectric material such as Teflon sleeve 36 is provided over outer tube 26 to protect the same and prevent electrical contact with the workpiece during operation of the apparatus.

Guiding and positioning means are provided in the apparatus disclosed herein to insure substantially constant operative relationship between electrode 2 and the workpiece portion to which heat is applied by the electrode. The stated means include a spring 38 mounted externally of tube 26 and adapted to apply pressure against one portion of the workpiece thereby forcing electrode 2 toward the workpiece surface upon which heat is applied. The stated guiding means further include track means in the form of an elongate track 40 comprising a metallic channel member which is advantageously incorporated into the workpiece structure and forms a permanent portion thereof. Track 40 is adapted to receive cam means comprising a circular cam or shoe 42 affixed to and projecting from elongate support means 14, 24, 26, 36 and appropriately sized to be slidably movable within track 40. Shoe 42 generally comprises an annular flange at its outer periphery as shown, and may be integrally formed on sleeve 36 or otherwise secured to outer tube 26 and is fixed in relationship therewith, so that force applied to tubes 14, 24, 26 and elements connected thereto, or to cable 52 attached to cam 42 for the purpose, will cause movement of electrode 2 along a path determined by the configuration of track 40.

From the description set forth above, it may be seen that the invention disclosed herein comprises apparatus adapted to fit within narrowly confined spaces such as between confronting face sheets of a honeycomb sandwich type steel panel as shown in FIGURE 4, for example, and to relieve residual stress in such sheets by applying heat to a weld seam such as seam 44 after fusion welding along the stated seam has been completed. In this connection, it may be noted that welding heat to produce seam 44 is normally applied from the upper surface 46 of the panel shown in FIGURE 4, and that penetration from the stated direction of heat application normally results in "peaking" of the upper face sheets 48 and 50 along seam 44 wherein a slight upward protruding of metal forming an inverted V along seam 44 results after cooling. The apparatus shown in FIGURES 1 through 3 is especially suitable for use in postweld heating progressively along seam 44 from the side of face sheets 48 and 50 opposite from surface 46 which tends to balance stresses induced by weld shrinkage. It will further be understood by those skilled in the art that the same apparatus disclosed herein may be used to accomplish progressive fusion welding where necessary or desirable. The apparatus is of small and compact size permitting entry of housing 10 and electrode 2 deeply within hollow workpieces having small access openings to reach relatively inaccessible locations, while guide means 40 and 42 permits movement over a controlled path of considerable length such as 50 feet.

While the particular details set forth above and in the drawings are fully capable of attaining the objects and providing the advantages herein stated, the structure and method thus disclosed are merely illustrative and could be modified or varied to produce the same results without departing from the scope of the inventive concept as defined in the appended claims.

We claim:

1. In a heating probe for applying heat at relatively inaccessible locations within a hollow workpiece:
   an electrode for producing an electric arc,
   elongate support means including a hollow metallic plug for supporting said electrode,
   track means on said workpiece including a track for guiding movement of said elongate support means,
   cam means on said elongate support means and movable together therewith, said cam means comprising a cam engageable with said track for guiding movement of said electrode, and
   said elongate support means comprising a plurality of elongate hollow tubes concentrically secured together to form a plurality of annular passages and secured to said plug for flowing a cooling fluid through said passages and over a portion of said plug.

2. In apparatus for applying heat at relatively inaccessible locations within a hollow workpiece:
   an elongate electrode for producing an electric arc,
   support means for guidably supporting said electrode in movable relationship with said workpiece whereby said arc may be moved along a continuous path of travel,
   said support means including a hollow elongate metallic plug adapted to receive and support one end of said electrode,
   said support means further including an electricially non-conductive housing mounted on said plug and having an opening through which said arc may be struck between said electrode and said workpiece,
   interior passage means in said plug for receiving a flow of inert gas and communicating said gas to said housing for surrounding said arc, and
   electrical conduit means connected to said plug for supplying current to said electrode.

3. The apparatus recited in claim 2 hereinabove, wherein:
   said electrical conduit means includes a hollow elongate conduit adapted to communicate said inert gas from an external supply to said interior passage means in said plug.

4. The apparatus recited in claim 3 hereinabove, wherein:
   said support means further includes co-axial conduit means operatively related to said plug and surrounding said elongate conduit, said co-axial conduit means being adapted to cool a portion of said plug by flowing a cooling fluid over said portion.

5. The apparatus recited in claim 2 above, wherein:
   said support means further includes a flanged projection extending therefrom, and
   said support means further includes a track mounted within said workpiece and stationary relative to said electrode, said track being adapted to receive said flanged projection in slidable guiding relationship therewith whereby said track defines said continuous path of travel during said movement of said electrode.

References Cited by the Examiner

UNITED STATES PATENTS

| | | | |
|---|---|---|---|
| 2,283,347 | 5/1942 | Young | 266—23 |
| 2,900,486 | 8/1959 | Williams et al. | 219—125 |
| 2,938,106 | 5/1960 | Hawthorne | 219—125 |
| 3,042,787 | 7/1962 | Kotecki | 219—60 |
| 3,111,575 | 11/1963 | Thompson et al. | 219—78 |

JOSEPH V. TRUHE, *Primary Examiner.*